US011510116B2

(12) United States Patent
Mackenzie et al.

(10) Patent No.: US 11,510,116 B2
(45) Date of Patent: Nov. 22, 2022

(54) MULTICAST-BROADCAST MOBILE COMMUNICATIONS NETWORK

(71) Applicant: British Telecommunications Public Limited Company, London (GB)

(72) Inventors: Richard Mackenzie, London (GB); Zaid Al-Daher, London (GB); Michael Fitch, London (GB)

(73) Assignee: British Telecommunications Public Limited Company, London (GB)

( * ) Notice: Subject to any disclaimer, the term of this patent is extended or adjusted under 35 U.S.C. 154(b) by 1 day.

(21) Appl. No.: 16/310,948

(22) PCT Filed: Jun. 23, 2017

(86) PCT No.: PCT/EP2017/065543
§ 371 (c)(1),
(2) Date: Dec. 18, 2018

(87) PCT Pub. No.: WO2018/001897
PCT Pub. Date: Jan. 4, 2018

(65) Prior Publication Data
US 2019/0342799 A1 Nov. 7, 2019

(30) Foreign Application Priority Data

Jun. 29, 2016 (EP) .................................... 16176922

(51) Int. Cl.
*H04W 36/00* (2009.01)
*H04W 36/30* (2009.01)

(52) U.S. Cl.
CPC ... *H04W 36/0083* (2013.01); *H04W 36/0007* (2018.08); *H04W 36/0058* (2018.08); *H04W 36/00837* (2018.08); *H04W 36/30* (2013.01)

(58) Field of Classification Search
CPC ............. H04W 36/0007; H04W 36/30; H04W 36/00837; H04W 36/0058
See application file for complete search history.

(56) References Cited

U.S. PATENT DOCUMENTS 7,363,039 B2    4/2008   Laroia et al.
7,885,235 B2    2/2011   Mochizuki et al.
(Continued)

FOREIGN PATENT DOCUMENTS

CN    101331779 A    12/2008
CN    101584175 A    11/2009
(Continued)

OTHER PUBLICATIONS

3GPP TR 23.768 V12.1.0 (Jun. 2014), "Study on Architecture Enhancements to Support Group Communication System Enablers for LTE (GCSE_LTE)," Technical Report, 3rd Generation Partnership Project, Technical Specification Group Services and System Aspects (Release 12), Jun. 2014, 63 pages.
(Continued)

*Primary Examiner* — Thinh D Tran
(74) *Attorney, Agent, or Firm* — Patterson Thuente IP

(57) ABSTRACT

A method and a base station for a mobile communications network. The base station includes a first transceiver configured to communicate over radio signals with a plurality of mobile terminals, in which the first transceiver configured to: transmit a first signal to serve a mobile terminal over multicast; receive from the mobile terminal information derived from the signal quality of a second signal received at the mobile terminal from a second transceiver; and receive from the mobile terminal further information on the quality of the first signal received at the mobile terminal from the first transceiver and on the quality of a third signal received at the mobile terminal from a third transceiver. The base station also includes a processor configured to, on the
(Continued)

basis of a comparison of the quality of the second signal with a threshold, switch communications between the first transceiver and the mobile terminal from multicast to unicast; and on the basis of a comparison of the quality of the first signal and the quality of the third signal, instruct the mobile terminal to transition from being served by the first transceiver to being served by the third transceiver.

8 Claims, 5 Drawing Sheets

(56) References Cited

U.S. PATENT DOCUMENTS

| | | |
|---|---|---|
| 8,554,211 B2 | 10/2013 | Angelow et al. |
| 8,588,171 B2 | 11/2013 | Fukuoka et al. |
| 8,644,261 B1 | 2/2014 | Vargantwar et al. |
| 9,001,737 B2 | 4/2015 | Amerga et al. |
| 9,030,988 B2 | 5/2015 | Sayeed et al. |
| 9,191,922 B2 | 11/2015 | Anchan et al. |
| 9,338,020 B2 | 5/2016 | Sridhar et al. |
| 9,380,526 B2 | 6/2016 | Koivisto et al. |
| 9,439,171 B2 | 9/2016 | Phan et al. |
| 9,648,584 B2 | 5/2017 | Hiben et al. |
| 9,723,523 B2 | 8/2017 | Purnadi et al. |
| 9,763,151 B2 | 9/2017 | Kim |
| 9,820,259 B2 | 11/2017 | Wang et al. |
| 9,826,502 B2 | 11/2017 | Cherian et al. |
| 9,860,935 B2 | 1/2018 | Teyeb et al. |
| 10,070,413 B2 | 9/2018 | Phan et al. |
| 10,075,883 B2 | 9/2018 | Zhao et al. |
| 10,084,581 B2 | 9/2018 | Sun et al. |
| 10,219,245 B2 | 2/2019 | Prasad et al. |
| 10,231,174 B2 | 3/2019 | Byun et al. |
| 10,277,416 B2 | 4/2019 | Zhu et al. |
| 10,292,020 B2 | 5/2019 | Frost et al. |
| 10,299,182 B2 | 5/2019 | Nagasaka et al. |
| 10,419,893 B2 | 9/2019 | Kesson et al. |
| 10,492,239 B2 | 11/2019 | Fujishiro et al. |
| 10,728,714 B2 | 7/2020 | Al-Daher et al. |
| 10,771,298 B2 | 9/2020 | Al-Daher et al. |
| 2002/0067909 A1 | 6/2002 | Iivonen |
| 2002/0112244 A1 | 8/2002 | Liou et al. |
| 2004/0106412 A1 | 6/2004 | Laroia et al. |
| 2007/0135170 A1 | 6/2007 | Khan et al. |
| 2008/0002691 A1 | 1/2008 | Qi et al. |
| 2008/0132263 A1 | 6/2008 | Yu et al. |
| 2008/0267317 A1 | 10/2008 | Malladi et al. |
| 2009/0175183 A1* | 7/2009 | Mochizuki ............ H04W 36/18 370/252 |
| 2009/0274453 A1 | 11/2009 | Viswambharan et al. |
| 2010/0035627 A1* | 2/2010 | Hou ...................... H04B 7/024 455/452.2 |
| 2010/0077441 A1 | 3/2010 | Thomas et al. |
| 2010/0216454 A1 | 8/2010 | Ishida et al. |
| 2011/0032832 A1 | 2/2011 | Jalali et al. |
| 2011/0305184 A1 | 12/2011 | Hsu et al. |
| 2013/0028118 A1 | 1/2013 | Cherian et al. |
| 2013/0044614 A1 | 2/2013 | Aguirre |
| 2013/0170424 A1 | 7/2013 | Anchan et al. |
| 2013/0170818 A1 | 7/2013 | Klappert et al. |
| 2013/0229974 A1 | 9/2013 | Xu et al. |
| 2013/0251329 A1 | 9/2013 | Mccoy et al. |
| 2013/0258934 A1 | 10/2013 | Amerga et al. |
| 2013/0258935 A1 | 10/2013 | Zhang et al. |
| 2013/0294321 A1 | 11/2013 | Wang et al. |
| 2013/0336173 A1 | 12/2013 | Mandil et al. |
| 2014/0095668 A1 | 4/2014 | Oyman et al. |
| 2014/0156800 A1 | 6/2014 | Falvo |
| 2014/0169255 A1 | 6/2014 | Zhang et al. |
| 2014/0192697 A1 | 7/2014 | Kirankumar et al. |
| 2014/0286222 A1 | 9/2014 | Yu et al. |
| 2014/0321826 A1 | 10/2014 | Stelmack et al. |
| 2015/0009821 A1 | 1/2015 | Sridhar et al. |
| 2015/0117323 A1 | 4/2015 | Hiben et al. |
| 2015/0163379 A1 | 6/2015 | Herzog et al. |
| 2016/0081070 A1 | 3/2016 | Li et al. |
| 2016/0105894 A1* | 4/2016 | Lu ........................ H04W 72/005 370/329 |
| 2016/0211980 A1* | 7/2016 | Zhu .......................... H04W 4/06 |
| 2016/0234570 A1 | 8/2016 | Van Deventer et al. |
| 2016/0269189 A1 | 9/2016 | Xu et al. |
| 2018/0263074 A1* | 9/2018 | Wang et al. .......... H04W 76/40 |
| 2019/0268197 A1 | 8/2019 | Al-Daher et al. |

FOREIGN PATENT DOCUMENTS

| | | |
|---|---|---|
| CN | 102300168 A | 12/2011 |
| CN | 102379100 A | 3/2012 |
| CN | 102405665 A | 4/2012 |
| CN | 103535093 A | 1/2014 |
| CN | 103546477 A | 1/2014 |
| CN | 103797873 A | 5/2014 |
| CN | 103974198 A | 8/2014 |
| CN | 104105070 A | 10/2014 |
| CN | 104303545 A | 1/2015 |
| CN | 104540043 A | 4/2015 |
| CN | 104756587 A | 7/2015 |
| CN | 104954994 A | 9/2015 |
| CN | 105103575 A | 11/2015 |
| CN | 105684473 A | 6/2016 |
| EP | 1650989 A1 | 4/2006 |
| EP | 2086173 A1 | 8/2009 |
| EP | 2 244 502 A1 | 10/2010 |
| EP | 2244502 A1 | 10/2010 |
| EP | 2244502 B1 | 6/2011 |
| EP | 2606662 A1 | 6/2013 |
| EP | 2775730 A1 | 9/2014 |
| EP | 2925003 A1 | 9/2015 |
| EP | 3125582 A1 | 2/2017 |
| GB | 2483125 A | 2/2012 |
| JP | 2013070841 A | 4/2013 |
| WO | WO-2009094744 A1 | 8/2009 |
| WO | WO-2012137078 A2 | 10/2012 |
| WO | WO-2012142428 A1 | 10/2012 |
| WO | WO-2013141874 A1 | 9/2013 |
| WO | WO-2014004787 A1 | 1/2014 |
| WO | WO-2014146617 A1 | 9/2014 |
| WO | WO-2015000912 A1 | 1/2015 |
| WO | WO-2015039888 A1 | 3/2015 |
| WO | WO 2015/062443 A1 | 5/2015 |
| WO | WO-2015061983 A1 | 5/2015 |
| WO | WO-2015062443 A1 | 5/2015 |
| WO | WO-2015069407 A1 | 5/2015 |
| WO | WO-2015071461 A1 | 5/2015 |
| WO | WO-2015080407 A1 | 6/2015 |
| WO | WO-2015103947 A1 | 7/2015 |
| WO | WO-2015166087 A2 | 11/2015 |
| WO | WO 2016/029938 A1 | 3/2016 |
| WO | WO-2016029938 A1 | 3/2016 |
| WO | WO-2017089183 A1 | 6/2017 |
| WO | WO-2017167648 A1 | 10/2017 |
| WO | WO-2017167835 A1 | 10/2017 |
| WO | WO-2017167838 A1 | 10/2017 |
| WO | WO-2018001897 A1 | 1/2018 |
| WO | WO-2018024395 A1 | 2/2018 |

OTHER PUBLICATIONS

3GPP TS 23.246 V9.5.0, release 9 (Jun. 2010), "LTE; Multimedia Broadcast/Multicast Service (MBMS), Architecture and Functional Description," Universal Mobile Telecommunications System (UMTS), Technical Specification, ETSI TS 123 246, Jun. 2010, 67 pages.
3GPP TS 23.468 V15.0.0 (Release 15), "LTE; Group Communication System Enablers for LTE (GCSE_LTE) Stage 2," Technical Specification Group Services and System Aspect, 3rd Generation Partnership Project, ETSI TS 123 468 V15.0.0, Jul. 2018, 32 pages.
Alcatel-Lucent, "Analysis of Service Continuity Requirement for Group Communication," 3GPP Draft; R2-140757, 3GPP TSG RAN WG2 Meeting #85, and Agenda Item: 7.6.3, Prague, Czech Republic, Feb. 10-14, 2014, 3 pages.

(56) References Cited

OTHER PUBLICATIONS

CATT, "Considerations on Service Continuity for eMBMS," 3GPP Draft; R2-134045, 3GPP TSG RAN WG2 Meeting #84, agenda Item: 7.6.3, San Francisco, USA, Nov. 2013, 4 pages.
CATT, "Evaluation on Service Continuity for eMBMS," 3GPP Draft; R2-140138, 3rd Generation Partnership Project (3GPP), Mobile Competence Centre ; 650, Route Des Lucioles ; F-06921 Sophia-Antipolis Cedex; France, vol. RAN WG2, Feb. 9, 2014, retrieved from URL: http://www.3gpp.org/ftp/Meetings_3GPP_SYNC/RAN2/Docs/, 3 pages.
CATT, "Methods for Service Continuity Improvement due to UE Mobility," 3GPP Draft; R2-140141,3GPP TSG RAN WG2 Meeting #85, Prague, Czech Republic, Feb. 10-14, 2014, 3 pages.
Combined search and Examination Report for Great Britain Application No. 1605519.6, dated Sep. 28, 2016, 4 pages.
Combined Search and Examination Report for Great Britain Application No. 1605525.3, dated Oct. 3, 2016, 8 pages.
Combined Search and Examination Report for Great Britain Application No. 1609547.3, dated Nov. 30, 2016, 6 pages.
Combined Search and Examination Report for Great Britain Application No. 1611277.3, dated Dec. 6, 2016, 8 pages.
Combined Search and Examination Report for Great Britain Application No. 1613477.7, dated Dec. 19, 2016, 5 pages.
ERICSSON, "MBMS Service Continuity Aspects for Group Communication," 3GPP DRAFT; R2-140821, 3rd Generation Partnership Project (3GPP), Mobile Competence Centre; 650, Route Des Lucioles; F-06921 Sophia-Antipolis Cedex, France, vol. RAN WG2, Feb. 9, 2014, retrieved from URL: http://www.3gpp.org/ftp/Meetings_3GPP_SYNC/RAN2/Docs/, 11 pages.
ETSI TS 103 286-2 VI.I.1 (May 2015), "Technical Specification; Digital Video Broadcasting (DVB), Companion Screens and Streams, Part 2: Content Identification and Media Synchronization," 650 Route des Lucioles F-06921 Sophia Antipolis Cedex, France, http://www.etsi.org/deliver/etsi_tsll03200103299/10328602/01.01.01_60/ts10328602v010101 p.pdf, retrieved on Apr. 24, 2018, 166 pages.
European Search Report for Application No. 16163451.4, dated Sep. 28, 2016, 8 pages.
European Search Report for Application No. 16163458.9, dated Sep. 20, 2016, 11 pages.
European Search Report for Application No. 16172341.6, dated Jun. 14, 2017, 10 pages.
European Search Report for Application No. 16182850.4, dated Jan. 17, 2017, 7 pages.
European Search Report for Application No. EP15196875.7, dated May 19, 2016, 6 pages.
"HbbTV 2.0.2 Specification," HbbTV Association, Retrieved on Apr. 24, 2018 from https://www.hbbtv.org/wpcontent/uploads/2018/02/HbbTVv202 specification_2018 02_16.pdf, Feb. 16, 2018, 313 pages.
Huawei, HiSilicon "Service Continuity for Group Communication Over eMBMS," 3GPP Draft; R2-140261, 3GPP TSG-RAN WG2 #85, Prague, Czech Republic, Feb. 10-14, 2014, 7 pages.
International Preliminary Report on Patentability for Application No. PCT/EP2017/057026, dated Oct. 11, 2018, 10 pages.
International Preliminary Report on Patentability for Application No. PCT/EP2017/057470, dated Oct. 11, 2018, 10 pages.
International Preliminary Report on Patentability for Application No. PCT/EP2017/057474, dated Oct. 11, 2018, 8 pages.
International Search Report and Written Opinion for Application No. PCT/EP2016/077747, dated Jan. 24, 2017, 12 pages.
International Search Report and Written Opinion for Application No. PCT/EP2017/057026, dated Apr. 18, 2017, 14 pages.
International Search Report and Written Opinion for Application No. PCT/EP2017/057470, dated Jun. 19, 2017, 12 pages.
International Search Report and Written Opinion for Application No. PCT/EP2017/057474, dated Jun. 13, 2017, 14 pages.
International Search Report and Written Opinion for Application No. PCT/EP2017/064946, dated Jul. 10, 2017, 13 pages.
International Search Report and Written Opinion for Application No. PCT/EP2017/065543, dated Jul. 24, 2017, 17 pages.

LG Electronics INC, "Service continuity for group communication," 3GPP Draft; R2-140766, 3GPP TSG RAN WG2 #85, Agenda Item: 7.6.3, Prague, Czech Republic, Feb. 10-14, 2014, 2 pages.
LTE, "Multicast Broadcast Single Frequency Network (MBSFN) Handbook," ShareTechnote, retrieved from http://www.sharetechnote.com/html/Handbook_LTE_MBSFN.html on Sep. 14, 2018, 13 pages.
NEC Corporation, "Enabling Service Continuity for Group Communication," 3GPP Draft; R2-140586_GCSE_SC, 3GPP TSG RAN2 Meeting #85, and Agenda Item: 7.6.3, Prague, Czech Republic, Feb. 10-14, 2014, 7 pages.
Prasad A., et al., "Enabling Group Communications for Public Safety in LTE-Advanced Networks," Journal of Network and Computer Applications, vol. 62, 2016, pp. 41-52.
Qualcomm Incorporated, "GCSE Service Continuity During Unicast and MBMS Switching," 3GPP Draft S2-133446 UC BC Switching, SA WG2 Meeting #99, Agenda Item: 6.5, Xiamen, China, Sep. 2013, 7 pages.
Qualcomm "LTE Evolved Multimedia Broadcast Multicast Service (eMBMS) Technology Overview," Qualcomm Research, San Diego, Nov. 2012, 18 pages.
Small Cell Forum, "X2 Interoperability," Release Four, Document 059.04.01, www.smallcellforum.org, Jun. 2014, 29 pages.
European Search Report for Application No. 16176922.9, dated Nov. 23, 2016, 11 pages.
International Preliminary Report on Patentability for Application No. PCT/EP2016/077747, dated Jan. 18, 2018, 10 pages.
DVB Organization: "ts_102796v010301p_draft_23-non-etsi-branding.pdf", DVB, Digital Video Broadcasting, C/O EBU—17A Ancienne Route—CH-1218 Grand Saconnex, Geneva—Switzerland, Oct. 9, 2014 (Oct. 9, 2014), XP017845818.
ETSI TS 123.246 "Universal Mobile Telecommunication System (UMTS); LTE; Multimedia Broadcast/Multicast Service (MBMS); Architecture and Functional Description (Release 9)," V9.5.0 (Jun. 2010); the 3rd Generation Partnership Project, pp. 1-67.
Examination Report for Great Britain Application No. 1605519.6 dated Sep. 27, 2018, 4 pages.
Written Opinion of the International Preliminary Examining Authority for Application PCT/EP2017/065543, dated Jun. 1, 2018, 11 pages.
Wu, et al., "CloudMo V: Cloud-based Mobile Social TV," Retrieved on Apr. 24, 2018 from http://i.cs.hku.hk/~cwu/papers/ywutmm12.pdf, 2012, 12 pages.
ZTE, "Service Continuity for Group Communication due to UE Mobility," 3GPP Draft; R2-140101, 3GPP TSG-RAN WG2#85, and Agenda Item: 7.6.3, Prague, Czech Republic, Feb. 10-14, 2014, 3 pages.
Application and Filing Receipt for U.S. Appl. No. 15/774,934, filed May 9, 2018, Inventor(s): REnnison et al.
U.S. Appl. No. 16/085,257, filed Sep. 14, 2018, Inventor(s): Mackenzie et al.
U.S. Appl. No. 16/085,328, filed Sep. 14, 2018, Inventor(s): Mackenzie et al.
U.S. Appl. No. 16/085,382, filed Sep. 14, 2018, Inventor(s): AL-Daher et al.
International Preliminary Report on Patentability for corresponding PCT Application No. PCTZEP2017/065543 dated Aug. 17, 2018; 29 pages.
International Search Report for corresponding PCT Application No. PCT/EP2017/065543 dated Jul. 24, 2017; 4 pages.
Written Opinion for corresponding PCT Application No. PCTZEP2017/065543 dated Jul. 24, 2017; 10 pages.
Examination Report for Great Britain Application No. GB1611277.3, dated Jun. 26, 2019, 4 pages.
Sharetechnote, "Multi Cell—Measurement in LTE," Nov. 28, 2019, 16 pages.
International Search Report, International Application No. PCT/EP2017/064946, dated Jul. 10, 2017, 4 pages.
International Searching Authority Written Opinion, International Application No. PCT/EP2017/064946, dated Feb. 8, 2018, 5 pages.
Prasad et al., "Enhancements for Enabling Point-to-Multipoint Communications Using Unlicensed Spectrum", https://www.researchgate.net/publication/324783210; May 1, 2018; 7 pages.

(56) References Cited

OTHER PUBLICATIONS

EP Extended Search Report for corresponding EP Application No. 16182850.4, dated Jan. 17, 2017, 7 pages.
Xincheng Zhang, *LTE Optimization and Principle and Method*, Jan. 2018, p. 47.
English Translation of Office Action for Chinese Application No. 201780048245.3, dated Nov. 30, 2020, 9 pages.
Application and Filing Receipt for U.S. Appl. No. 16/318,533, filed Jan. 17, 2019, inventors Al-Daher et al.
Application as filed for U.S. Appl. No. 16/310,948, filed Dec. 18, 2018, Inventor(s):MacKenzie., et al., 282 pages.
Combined Search and Examination Report under Section 17 and 18(3) for GB Application No. 1613477.7, dated Dec. 19, 2016, 5 pages.
Communication Pursuant to Article 94(3) EPC for Application No. 17713043.2, dated Feb. 11, 2021, 6 pages.
Examination Report for Great Britain Application No. 1521000.8 dated Nov. 27, 2017, 12 pages.
Examination Report under Section 18(3) for Great Britain Application No. 1605519.6 dated Jul. 5, 2019, 4 pages.
Examination Report under Section 18(3) for Great Britain Application No. 1609547.3, dated Aug. 20, 2019, 2 pages.
First Office Action for Chinese Application No. 201780040711.3, dated Aug. 4, 2020, 12 pages.
International Preliminary Report on Patentability for Application No. PCT/EP2017/064946, dated Feb. 14, 2019, 7 pages.
Office Action for Chinese Application No. 201780015137.6, dated Jan. 29, 2022, 18 pages.
Office Action for Chinese Application No. 201780015375.7, dated Jun. 3, 2021, 3 pages.
Office Action for Chinese Application No. 201780015375.7, dated Sep. 29, 2020, 17 pages.
Prasad A., et al., "Enhancements for Enabling Point-to-Multipoint Communication Using Unlicensed Spectrum," Retrieved from https://www.reserachgate.net/publication/324783210, 2018, 7 pages.

* cited by examiner

the mobile terminal and

MULTICAST-BROADCAST MOBILE COMMUNICATIONS NETWORK

CROSS-REFERENCE TO RELATED APPLICATION

The present application is a National Phase entry of PCT Application No. PCT/EP2017/065543, filed Jun. 23, 2017, which claims priority from EP Patent Application No. 16176922.9, filed Jun. 29, 2016 each of which is hereby fully incorporated herein by reference.

TECHNICAL FIELD

The present disclosure relates to mobile communication networks and to a method and base station for a mobile communications network.

BACKGROUND

Multimedia content, such as video playback, live streaming, online interactive gaming, file delivery and mobile TV, is seen as the key driver for data traffic demand on wireless cellular networks. Multimedia content to a large number of users can be distributed by unicast, broadcast and multicast. In the following, the term "multicast" is used to include "broadcast" and vice versa. Unicast is a dedicated bidirectional point-to-point link for transmission between the base station and one user mobile device. Evolved Multimedia Broadcast Multicast Service (eMBMS) is an LTE technique enabling a specific broadcast bearer to deliver data content to multiple users over shared downlink resources, which is more efficient than dedicating a unicast bearer for each user. Multicast-broadcast single-frequency network (MBSFN) further improves spectral efficiency by dynamically forming single-frequency networks whereby a mobile terminal (in LTE, the UE) can seamlessly receive the same content over eMBMS from multiple base stations (in LTE, the eNodeB) within a MBSFN area. A single-frequency network comprises groups of adjacent eMBMS base stations at which the same signal is synchronized and broadcast simultaneously on the same MBSFN sub-carrier frequencies and time-slots. The combination of eMBMS transmission from multiple base stations in a MBSFN service area provides a degree of transmission robustness in the form of spatial transmit diversity and effectively eliminates internal cell edges.

WO 2015/062443 A1 describes switching reception of a service from a network within a first MBSFN area supporting eMBMS broadcast service to reception through a second MBSFN area supporting unicast.

A problem exists in handling the transfer of a mobile terminal between different MBSFN areas and between MBSFN and reserved unicast cells. A similar problem exists in handling the transfer of a mobile terminal between eMBMS cells. Seamless mobility of the mobile terminals across an LTE network with different MBSFNs is not supported in 3GPP, so that service interruption may result, i.e. due to delays at the cell-edges while the mobile terminal acquires information about the targeted area or cell. Service interruption may also result when a the mobile terminal transitions from a MBSFN providing an eMBMS broadcast service to a MBSFN where the service in question is only available by unicast.

SUMMARY

The present disclosure accordingly provides, in a first aspect, a method of operating a base station in a mobile communications network comprising a plurality of base stations, in which each base station comprises at least one transceiver, in which a first transceiver is comprised in a first base station, in which the method comprises, at the first base station, operating the first transceiver to: transmit a first signal to serve a mobile terminal over multicast; and receive information from the mobile terminal, in which the information is derived from the signal quality of a second signal received at the mobile terminal from a second transceiver; and receive further information from the mobile terminal, in which the further information derives in part from the quality of the first signal received at the mobile terminal from the first transceiver and in which the information derives in part from the quality of a third signal received at the mobile terminal from a third transceiver; on the basis of a comparison of the quality of the second signal received at the mobile terminal with a threshold, switching communications between the first transceiver and the mobile terminal from multicast to unicast; and subsequently, on the basis of a comparison of the quality of the first signal and the quality of the third signal, both received at the mobile terminal, when the quality of the first signal is no longer greater than the quality of the third signal, providing to the mobile terminal an instruction; in which the instruction instructs the mobile terminal to transition from being served by the first transceiver to being served by the third transceiver.

In this way mobile devices located nearer to the edge of a MBSFN area may be switched to unicast in a timely manner before transferring to be served by a different base station transceiver, i.e. before the handover process to a base station transceiver in a different MBSFN area. In particular, the invention can enhance mobile terminal mobility for eMBMS services operating in MBSFN architectures so as to reduce service interruption when a mobile terminal moves between MBSFN areas or between eMBMS base stations.

According to an embodiment, the method further comprises, at the first base station: monitoring loading of radio resources used by the first transceiver; and varying, the threshold in dependence on the monitored loading.

According to an embodiment, the method further comprises, upon detecting an increase in the loading, varying the threshold so as to reduce the rate at which mobile terminals served by the first base station are switched to unicast.

According to an embodiment, the method further comprises, upon detecting a decrease in the loading, varying the threshold so as to increase the rate at which mobile terminals served by the first base station are switched to unicast.

According to an embodiment, the loading comprises at least one of the radio resource usage load at the first transceiver and traffic levels on radio frequency transmissions between the first transceiver and at least one mobile terminal.

According to an embodiment, the method further comprises varying the threshold on the basis of a comparison with reference data, of data gathered through monitoring a plurality of mobile terminals being served by the first transceiver and transitioning to being served by the third transceiver, including data gathered through monitoring occurrences of switching communications between the first transceiver and the mobile terminal from multicast to unicast.

According to an embodiment, the mobile terminal is in motion relative to the transceivers, in which the distance between the mobile terminal and the second transceiver at the point of providing to the mobile terminal the instruction is greater than the distance between the mobile terminal and the second transceiver at the point of switching communications between the first transceiver and the mobile terminal from multicast to unicast.

The disclosure also provides in a second aspect, a base station for a mobile communications network, in which the base station comprises: a first transceiver configured to transmit radio signals to a plurality of mobile terminals and to receive radio signals from a plurality of mobile terminals; in which the first transceiver is configured to: transmit a first signal to serve a mobile terminal over multicast; receive information from the mobile terminal, in which the information is derived from the signal quality of a second signal received at the mobile terminal from a second transceiver; and receive further information from the mobile terminal, in which the further information derives in part from the quality of the first signal received at the mobile terminal from the first transceiver and in which the information derives in part from the quality of a third signal received at the mobile terminal from a third transceiver; and a processor configured to: on the basis of a comparison of the quality of the second signal received at the mobile terminal with a threshold, switch communications between the first transceiver and the mobile terminal from multicast to unicast; and subsequently, on the basis of a comparison of the quality of the first signal and the quality of the third signal, both received at the mobile terminal, when the quality of the first signal is no longer greater than the quality of the third signal, provide to the mobile terminal an instruction; in which the instruction instructs the mobile terminal to transition from being served by the first transceiver to being served by the third transceiver.

The present disclosure accordingly provides, in a third aspect, a computer program element comprising computer program code which, when loaded into a computer system and executed thereon, causes the computer to perform the method set out above.

BRIEF DESCRIPTION OF THE DRAWINGS

In order that the present disclosure may be better understood, embodiments thereof will now be described, by way of example only, with reference to the accompanying drawings in which.

DETAILED DESCRIPTION

Figure 1:
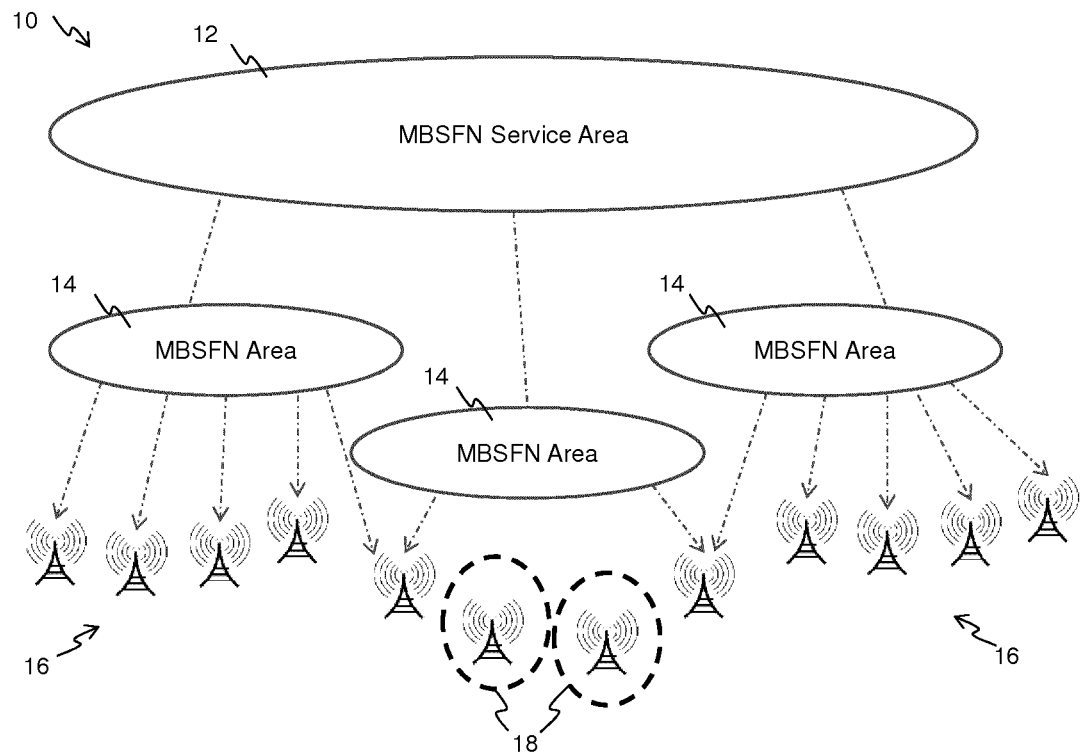
FIGS. 1 and 2 show a conventional 3GPP mobile communications network.

Embodiments of this disclosure enhance mobile terminal mobility for eMBMS services operating in MBSFN architectures so as to reduce service interruption when a mobile terminal executes a transition, i.e. transitions between MBSFN areas or between eMBMS cells. Embodiments of the disclosure switch base station transceiver communication with a mobile terminal from broadcast to unicast in preparation for a mobile terminal executing a transition as defined above. In particular, embodiments of the disclosure can avoid service interruption by defining a trigger for initiating switching eMBMS service for the mobile terminal from broadcast to unicast before the mobile terminal transitions. The trigger is not dependent on the decision to transition the mobile terminal. Embodiments of the disclosure are particularly aimed at base stations located at the edge of an MBSFN area and at other network locations where seamless mobility of mobile terminals is not currently supported.

Embodiments of the disclosure provide two distinct criteria to achieve, in a serving cell/sector, switching a mobile terminal to unicast and the transition of the mobile terminal to a target cell/sector other than the current serving cell/sector. A switch to unicast is triggered, according to a first criterion, depending on the quality of a signal (the second signal) received at the mobile terminal from a cell/sector other than the current serving cell/sector and other than the target cell/sector, where, the target cell/sector is a cell/sector that the mobile terminal is moving towards and later transitions to. According to an embodiment of the disclosure, the first criterion is met when the quality of the second signal meets or passes a threshold, i.e. as the quality of the second signal decreases or increases. The quality of the second signal will typically decrease when the mobile terminal is moving away from the source of the second signal, which may, in this case, be a transceiver in a cell/sector which formerly served the mobile terminal prior to its transition to the current serving cell/sector. The quality of the second signal will typically increase when the mobile terminal is moving towards the source of the second signal, which may, in this case, be a transceiver in a macro cell/sector which overlaps the current, serving small-cell.

A transition from the current serving cell/sector to the target cell/sector is subsequently triggered, according to a second criterion, i.e. based on a comparison of the quality of a signal (the first signal) received at the mobile terminal from the current serving cell/sector to the quality of a signal (the third signal) received at the mobile terminal from the target cell/sector. According to an embodiment of the disclosure, the transition from the current serving cell/sector to the target cell/sector is subsequently triggered when the quality of the first signal is no longer greater than the quality of the third signal, i.e. as at least one of the quality of the first signal decreases and the quality of the third signal increases. The first signal will typically decrease as the mobile terminal is moving away from the source of the first signal, which will be a transceiver in the current serving cell/sector. The third signal will typically increase as the mobile terminal is moving towards the source of the third signal, which will be a transceiver in the target cell/sector.

Figure 4A:
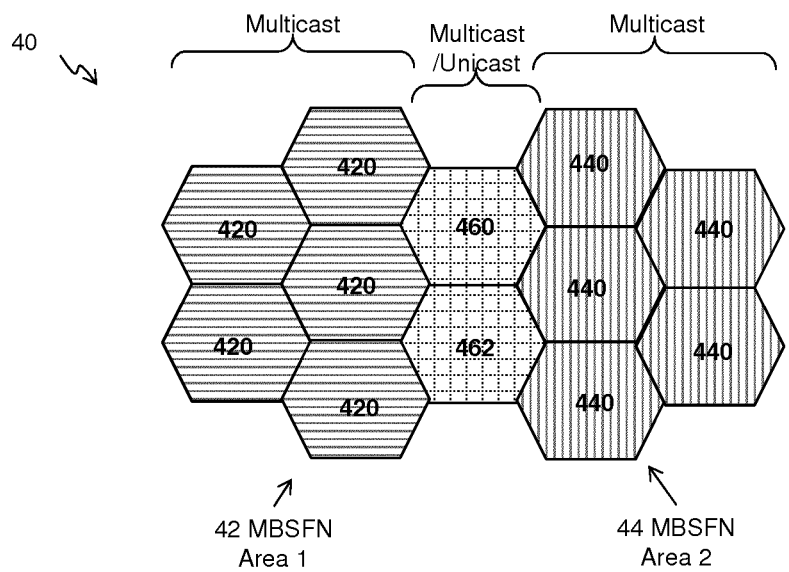
FIGS. 4a, 4b and 4c show mobile communications networks according to embodiments of the disclosure.
Figure 4B:
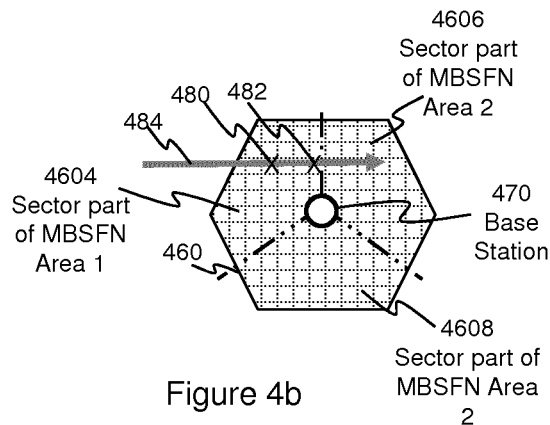
Figure 4C:
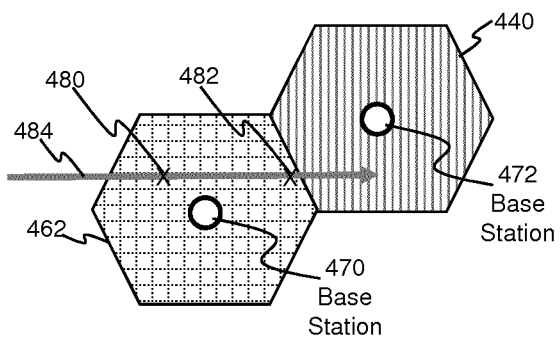

According to an embodiment of the disclosure, movement of the mobile terminal along the path 484 in FIGS. 4b and 4c will, assuming it follows a straight line or something approximating to a straight line, satisfy both of the above conditions once the mobile terminal has traversed half of its trajectory across the serving cell 462 or serving sector 4604. According to an embodiment of the disclosure, the threshold may be chosen so that the switch to unicast occurs before the mobile terminal has traversed half of its trajectory across the serving cell 462, for example while the first signal quality is increasing. To this end, the base station may monitor the behavior of a plurality of mobile terminals in switching to unicast and the threshold may be varied in response to the behavior of the plurality of mobile terminals in switching to unicast. In addition, the base station may monitor the plurality of mobile terminals being served by the first transceiver in transitioning to being served by the third transceiver.

A value for signal quality may be derived from measuring signal power of LTE reference signals using the reference signal received power (RSRP) parameter or, alternatively Reference Signal Received Quality (RSRQ). To calculate RSRP, the total received power of multiple reference signal subcarriers of a LTE signal is averaged. According to an embodiment of the disclosure, the first and second criteria relate to measurements at the mobile terminal of RSRP values.

The first and second criteria may depend on channel conditions (i.e. conditions in communications channels between the base station and the mobile terminal). For example, where there are a lot of multi-path and shadowing effects, the measured signal quality may be prone to fading and recovering and may change quickly in response to a small displacement of the mobile terminal. In which case, the threshold may be selected so that switching to unicast occurs earlier.

As indicated above, when a mobile terminal using multicast transitions out of an MBSFN area into another MBSFN area or to a cell that does not provide the required MBMS service, then service interruption may be expected. For mobility between MBSFN areas, there is expected to be a service interruption of around 1.5 seconds. This can arise from a combination of mobility time plus the time to read SIBs of the new serving cell (as described, below, with reference to FIG. 6). For mobility to a non-MBSFN cell (i.e. a cell that is not part of a MBSFN area), a service interruption of around 0.5 seconds is expected. This includes time to read the SIBs of the new serving cell and then to setup a unicast bearer. Switching a mobile terminal from a multicast service to a unicast service reduces service interruption when moving out of an MBSFN area (whether moving into another MBSFN area or to a non-MBSFN cell). Where the switch to unicast occurs while the mobile terminal is still receiving good coverage of its serving base station, then the switch to unicast should further reduce service interruption. For example minimal interruptions may result from an increased likelihood of achieving make-before-break service continuity from multicast to unicast and a reduced likelihood of random failure of an access frequency (which can adversely affect initial call setup step and registration). According to an embodiment of the disclosure, a base station takes responsibility for managing the transition of a mobile terminal that is moving from an MBSFN area to a different MBSFN area, and also appropriately manages the timing of a transition from multicast to unicast. This reduces the risk of service interruptions for mobile terminals entering a different MBSFN area (as service interruption for switching from unicast to multicast can be zero).

In Evolved Universal Terrestrial Radio Access Network (E-UTRAN), eMBMS services may be provisioned by defining MBSFN areas within a geographical area designated for broadcast/multicast services. A broadcast/multicast service area could be a single cell or multiple cells in which broadcast or multicast service is available. A multi-cell MBSFN area defines a set of base stations participating in MBSFN service modes. FIG. 1 illustrates a MBSFN network structure. Within MBSFN network 10, an operator operates a MBSFN service area 12 for deploying a broadcast/multicast service. Within that service area there may be a plurality of MBSFN areas 14. Each MBSFN area 14 consists of a number of base stations 16, each serving a different cell (not shown). The base stations 16 in a particular MBSFN area 14 are capable of synchronizing together to provide the MBSFN service across multiple cells in the MBSFN area. Some of the base stations 16 within the MBSFN areas 14, serve reserved cells 18. A MBSFN area reserved cell is a cell within a MBSFN area that does not contribute to the MBSFN transmission and may be used for other services, e.g. unicast. Within a MBSFN area, eMBMS can be provided over a single frequency layer dedicated to MBSFN transmission or over a single frequency layer that is shared between MBSFN transmission and unicast services. Where Radio Resource Control (RRC) is used, reception of eMBMS services is available for the mobile terminals in RRC_Connected or RRC_Idle states.

LTE supports overlap between MBSFN service areas, for example, smaller MBSFN areas can overlap larger ones for regional and national coverage. In 3GPP LTE or 4G, one base station can belong to up to eight MBSFN areas. All base stations transmitting MBSFN in a single area are required to be synchronized, so that the same multimedia content is transmitted from all the base stations with a mutual offset of no more than a few micro-seconds.

Figure 2:
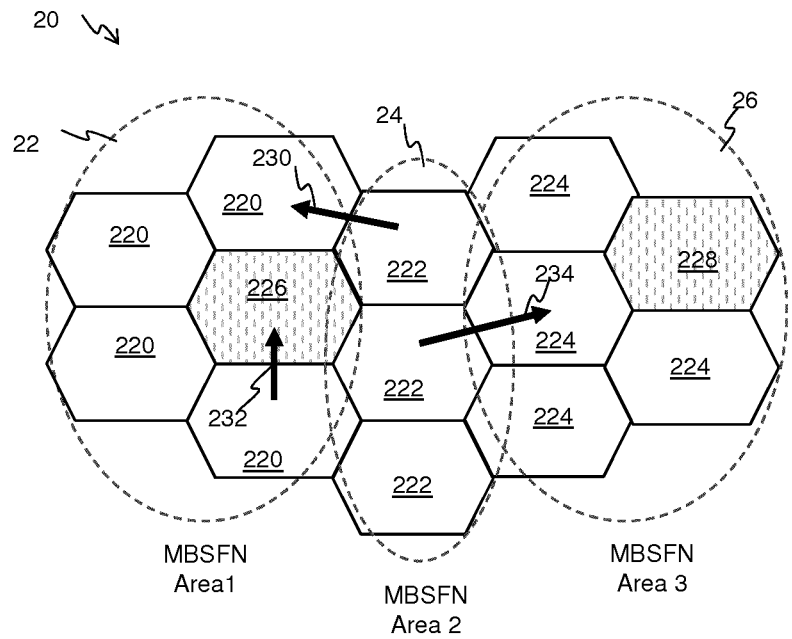

One of the key features of the LTE network is mobility provision. Supporting seamless user mobility across the network requires service continuity for eMBMS users and plays an important role in maintaining service quality and customer satisfaction. There are a number of scenarios where it would be desirable for a LTE mobile terminal to be able to transition from one base station to another whilst receiving MBSFN service, for example when a mobile terminal is moving into a MBSFN area reserved cell 18 whilst receiving an eMBMS service and when moving from one MBSFN cell to another cell not within the same MBSFN area. FIG. 2 shows MBSFN service area 20 comprising exemplary MBSFN areas 22, 24 and 26—each MBSFN area comprising a plurality of cells, each cell defined by a different base station (not shown). MBSFN area 22 comprises a plurality of multicast/broadcast cells 220 and one MBSFN area reserve (unicast) cell 226. MBSFN area 24 comprises a plurality of multicast/broadcast cells 222 but no MBSFN area reserve (unicast) cell. MBSFN area 26 comprises a plurality of multicast/broadcast cells 224 and one MBSFN area reserve (unicast) cell 228. Exemplary transitions between the cells of MBSFN service area 20 are shown, as follows. Transitions 230 and 234 represent a mobile terminal passing from one multicast/broadcast cell to another multicast/broadcast cell in a different MBSFN area. Transition 232 represents a mobile terminal passing from a multicast/broadcast cell to an MBSFN area reserved cell in the same MBSFN area.

Figure 3:
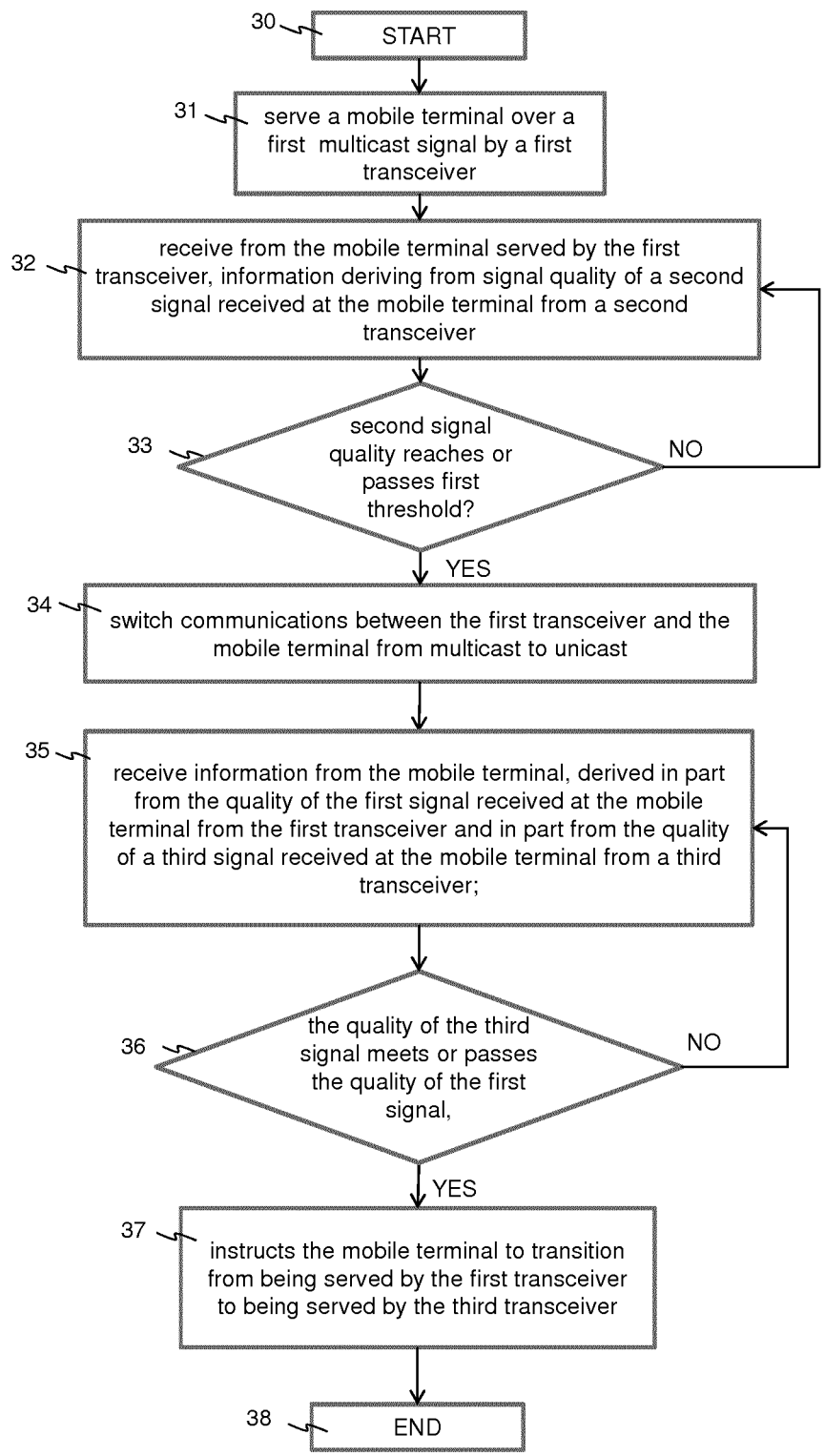
FIGS. 3 and 6 show a sequences of events according to embodiments of the disclosure.

FIG. 3 shows a sequence of events according to an embodiment of the disclosure. The sequence of FIG. 3 relates to a mobile communications network comprising a plurality of base stations, in which each base station comprises at least one transceiver comprising a transmitter and a receiver, in which a first transceiver is comprised in a first base station. At 31, a mobile terminal is served over multicast/broadcast across a mobile network by a base station by use of a first transceiver. At 32, the base station receives from the mobile terminal served by the first transceiver, information deriving from signal quality of a second signal received at the mobile terminal from a second transceiver (i.e. not the transceiver currently serving the mobile terminal). The base station can use this information to assess when to switch communication with the mobile terminal from multicast/broadcast to unicast. At decision element 33 the quality of the second signal is compared to a first threshold value. According to an embodiment of the disclosure, if the quality of the second signal is determined to have reached or passed the first threshold value, then processing passes on to process element 34. Otherwise processing returns to process element 32. At 34, based on the first comparison of decision element 33, communication with the mobile terminal by the first transceiver is switched from multicast/broadcast to unicast. A first instruction may be provided to the mobile terminal to instruct the mobile terminal to switch to unicast. Following the switch to unicast, at 35, signal quality information relating to a first signal received at the mobile terminal from the first transceiver and signal quality information relating to a third signal received at the mobile terminal from a third transceiver is received. At decision element 36, the quality of the first signal is compared to the quality of the third signal. If the quality of the third signal is determined to have reached or passed the quality of the first signal, then processing passes on to process element 37. Otherwise processing returns to process element 35. At 37, the mobile terminal is instructed to transition from being served by the first transceiver to being served by the third transceiver.

FIG. 4a shows a mobile communications network, by way of example, a LTE network 40 compromising a first MBSFN area 42 comprising cells 420 and a second MBSFN area 44 comprising cells 440. First MBSFN area 42 and second MBSFN area 44 overlap at cells 460 and 462, which form part of both first and second MBSFN areas. In FIG. 4a, cells 460 and 462 in the overlapping regions between MBSFN areas may have sectors (e.g. sectors 4604, 4606 and 4608, as shown in FIGS. 4b or may be non-sectored, as shown in FIG. 4c). Shared cells 460, 462 may be unicast or multicast. The other cells 420, 440 in first MBSFN area 42 and second MBSFN area 44 are multicast. First MBSFN area 42 serves a first eMBMS service and comprises multicast cells 420 together with cells 460, 462 or one or more sector therefrom. Second MBSFN area 44 serves a second eMBMS service and comprises multicast cells 440 together with cells 460, 462 or one or more sector therefrom.

Embodiments of the disclosure have application to both sectored and un-sectored cells. Whereas in a conventional, un-sectored cell the base station has a single transceiver (comprising a transmitter and receiver) and provides the same service to the entire area within radio range (i.e. the entire cell) in an omni-directional fashion, in a sectored cell, a single base station uses multiple transceivers, each transceiver comprising a transmitter and receiver for providing service to a different sector to effectively enhance the signal qualities available to mobile terminals in the base station's coverage area. Each transceiver comprises a directional antenna to transmit signals in and receive signals from different directions. According to an embodiment of the disclosure, in a sectored cell, different signals may be provided by a single base station via different transceivers. The sectored cell variant of the invention uses intra-cell mobility (i.e. handover or reselection between sectors). Intra-cell mobility is an internal procedure in which mobile terminals are transferred between transceivers on the same base station, so that the mobile terminal is still served by the same base station. Hence, a mobile terminal transitioning between sectors may "handover" to the same base station, in which cases the procedure may be implemented within the base station that serves all the sectors of the cell.

FIG. 4b shows an example implementation relating to sectored cells. Looking at FIG. 4b: a mobile terminal follows a path 484 directly between two sectors 4604, 4606: each sector allocated to a different MBSFN. Path 484 indicates movement of the mobile terminal from a previous cell or sector (i.e. one of cells 420—not shown in FIG. 4b) through the current sector 4604 and on to a subsequent sector (which we may refer to as a "target" sector) 4606. As the mobile terminal follows the path 484 in sector 4604 towards location 480, the quality of received signal quality (for example, measured using the RSRP) from a neighboring transceiver (i.e. not the sector 4604 transceiver serving the mobile terminal) is compared, in a first comparison, with a first threshold value. At location 480 in sector 4604 on path 484, the result of the comparison indicates that the quality of the received signal meets a first criterion, i.e. reaches or passes the first threshold value. Location 480 may occur at different positions along path 484 to that shown, depending on conditions and could, for example occur closer to or further away from the target sector 4606. In response, the base station serving the current sector 4604 changes from multicast to unicast, the service provided to the mobile terminal by the current serving (sector 4604) transceiver. As the mobile terminal follows the path 484 in sector 4604 between location 480 and location 482, the received signal quality from the current serving (sector 4604) transceiver is compared, in a second comparison, with the received signal quality from a neighboring (sector 4606) transceiver. At location 482 on path 484, which is still in sector 4604 but is further along path 484 than location 480 (i.e. closer to target sector 4606 than location 480), the result of the second comparison meets a second criterion, so triggering transition of the mobile terminal to receiving service from a different transceiver or base station, i.e., in this example, the sector 4606 transceiver.

FIG. 4c shows an example implementation relating to un-sectored cells. Looking at FIG. 4c: a mobile terminal follows a path 484 across cell 462. Path 484 indicates movement of the mobile terminal from a previous sector or cell (i.e. one of cells 420—not shown in FIG. 4c) through the current cell 462 and on to a subsequent cell (which we may refer to as a "target" cell) 440. As the mobile terminal traverses cell 460, it is detecting, and measuring the quality of signals received from a number of different base stations in the proximity, including the base station 470 serving the current cell 462 and a base station 472 serving a target cell 440, towards which the mobile terminal is moving.

At location 480 on path 484, a first comparison of the quality of the signal received from the base station of a neighboring cell (i.e. not the base station 470 currently serving the mobile terminal and not the base station 472 serving target cell 440) meets or passes the first criterion. This is reported to the base station 470 serving the current cell 462, which changes the service provided to the mobile from multicast to unicast. Location 480 may occur at different positions along path 484 to that shown, depending on conditions and could, for example occur closer to or further away from the target cell 440.

At Location 482, which is still located in cell 462 but is further along path 484 than location 480 (i.e. closer to target cell 440 than location 480), a comparison of the quality of the signal received at the mobile terminal from the current serving transceiver to the received signal quality from the target cell transceiver meets the second criterion, so triggering transition of the mobile terminal to receiving service from the base station 472 serving target cell 440.

Location 482, which is located in cell 462 but is further along path 484 than location 480 (i.e. closer to target cell 440 than location 480), will be reached by the mobile terminal sometime after the change to unicast which takes place at location 480. For example, location 482 may be set on a part of path 484 in which the quality of the signal received from the current, serving transceiver is increasing (which will normally be the case when the mobile terminal is approaching the current, serving transceiver), whereas the location 482 may be set at a part of path 480 in which the quality of the signal received from the current, serving transceiver is decreasing (which will normally be the case when the mobile terminal is departing the current, serving transceiver). Alternatively, the system may be set up such that the comparison between the first and third signals is initiated following changing the service provided to the mobile from multicast to unicast.

According to an embodiment of the disclosure, both criteria are fed by the base station to the mobile terminal, which carries out the comparisons and provides the results to the serving base station.

According to an embodiment of the disclosure, the serving base station instructs the mobile terminal to provide measurement reports on signals received from the transceivers of the serving base station and from transceivers of base stations in neighboring sectors or cells as it traverses the sector or cell. The serving base station applies the criteria to the measurements it receives and carries out the comparisons.

According to an embodiment, the rate of transfer of the mobile terminals from multicast to unicast may be regulated so as to control the system load (since unicast places a higher load). According to embodiments of the invention, the threshold will be made to vary depending on load. According to an embodiment of the invention, the threshold value is programmed into the base station during manufacture or is provided over the network on initialization. According to an embodiment of the disclosure, the value of the threshold may be varied in operation on the basis of data gathered through monitoring mobile terminals transiting the serving cell/sector and comparing occurrences of switches to unicast with a target occurrence. According to this embodiment, the base station may monitor occasions where no switch to unicast occurs prior to a transition of the mobile terminal to a target cell/sector and also occasions where a switch to unicast occurs earlier than necessary. According to this embodiment, the base station may adjust the threshold so that the switch to unicast occurs at a different point on the path 480, for example, to increase the likelihood that the switch to unicast occurs prior to the transition to the target cell/sector.

The load may be defined as one or a combination of: radio network load, backhaul network load and processing load on the base station. The radio network load may comprise at least one of: the radio resource usage load at the base station and traffic levels on communications channels between the base station and the plurality of the mobile terminals. The load may be calculated at the base station, for example by monitoring physical resource block (PRB) usage (i.e. the number of PRBs used averaged over time, reported as a percentage). Backhaul network load may simply be measured in terms of data rate or proportion of available resources that are being used. It could be that the capacity of the radio network or the backhaul varies (e.g. due to contention, environmental conditions or equipment failure). Processing load may be measured in terms of the proportion of available base station processing resources that are being used. Processing resources may be scalable (e.g. by booting-up additional cores or adding memory, when required). In general, the processing required for accommodating one additional unicast stream will be higher than adding an additional user to an existing multicast stream.

As previously indicated, a switch to unicast is triggered, according to a first criterion, depending on the quality of the second signal received at the mobile terminal from a cell/sector other than the current serving cell/sector and other than the target cell/sector. According to an embodiment of the disclosure, the base station may acquire knowledge on signals received at the mobile terminal from neighboring cells and may determine which signal or signals to select as the second signal, so as to provide the best basis for triggering the switch to unicast.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present disclosure. The computer program may be embodied as source code or undergo compilation for implementation on a processing device, apparatus or system or may be embodied as object code, for example.

According to an embodiment, the base station reports calculated load to the mobile terminal.

Figure 5:
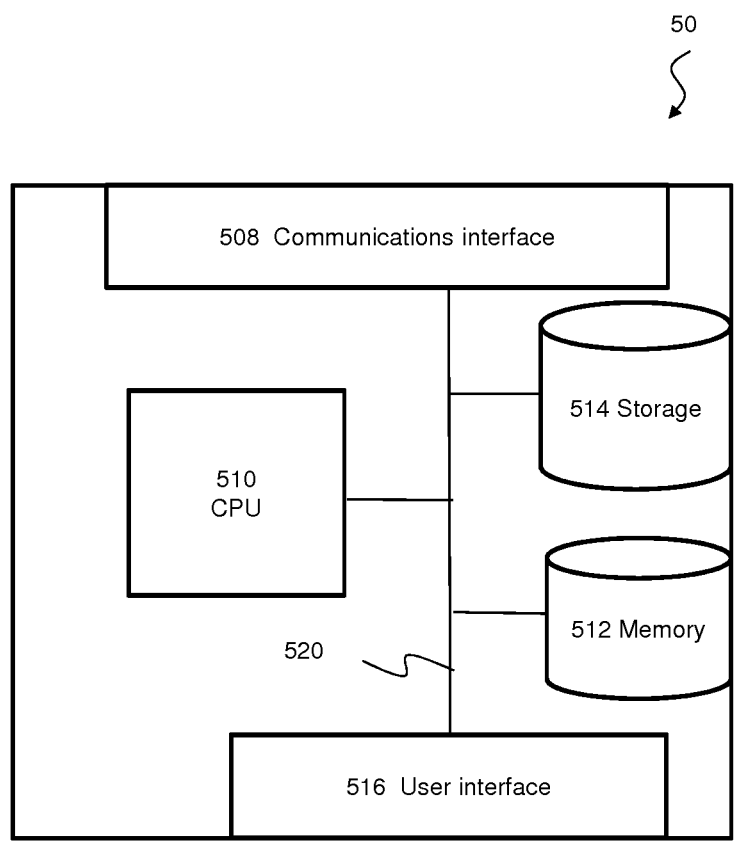
FIG. 5 is a block diagram of a data processing system suitable for the operation of embodiments of the present disclosure.

FIG. 5 is a block diagram of a data processing system 50 suitable for the operation of embodiments of the present disclosure. A central processor unit (CPU) 510 is communicatively connected to communications interface 508, a memory 512, a storage 514 and an input/output (I/O) interface 516 via a data bus 520. The memory 512 can be any read/write storage device such as a random access memory (RAM) or a non-volatile storage device suitable for storing data for use by processor 512. The storage 514 can be any read-only or read/write storage device such as a random access memory (RAM) or a non-volatile storage device suitable for storing computer program code for controlling the operation of processor 510. Memory 512 and storage 514 may comprise the same device or devices. Suitably, the computer program is stored on a carrier medium in machine or device readable form, for example in solid-state memory, magnetic memory such as disk or tape, optically or magneto-optically readable memory such as compact disk or digital versatile disk etc., and the processing device utilizes the program or a part thereof to configure it for operation. The computer program may be supplied from a remote source embodied in a communications medium such as an electronic signal, radio frequency carrier wave or optical carrier wave. Such carrier media are also envisaged as aspects of the present disclosure. The user interface 516 is an interface to devices for the input or output of data provided to or received from a user or operator of computer system 50. Examples of I/O devices connectable to user interface 516 include a keyboard, a mouse, a display (such as a monitor) and a network connection. Communications interface 508 is an interface to other devices and may comprise one or more radio transceiver interfaces and one or more wired or wireless core network interfaces.

Figure 6:
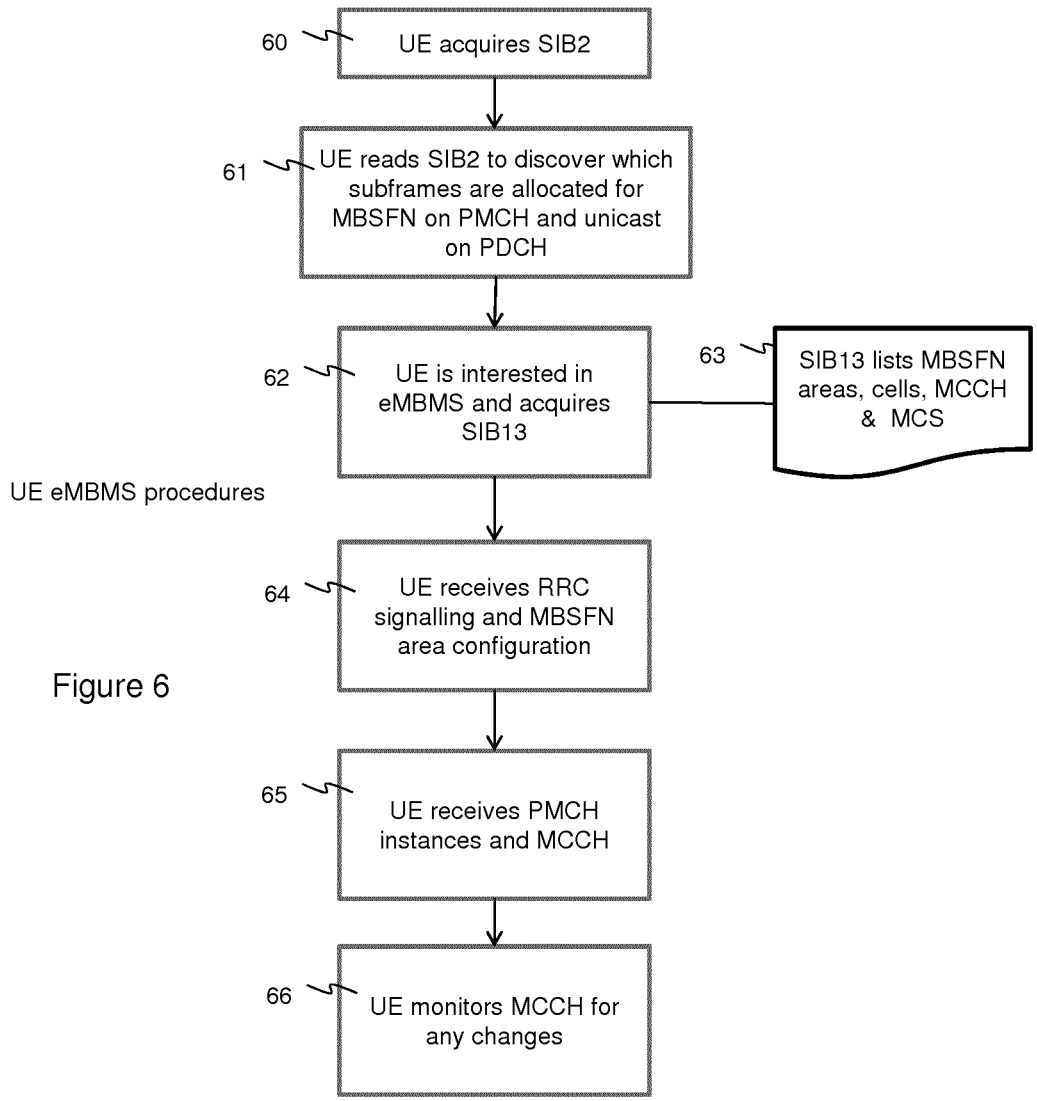

FIG. 6 shows a sequence of events relating to receipt and processing of system information blocks. With reference to FIG. 6 at 60, the mobile terminal acquires from the serving base station a system information block type 2 (SIB2) containing radio resource configuration information that is common for all the mobile terminals served by that cell. At 61, the mobile terminal reads SIB2 to discover which sub-frames are allocated for MBSFN on PMCH and unicast on PDCH. At 62, the mobile terminal, being interested in eMBMS, acquires SIB13 (63), which contains information required to acquire the MBMS control information associated with one or more MBSFN areas. For example, SIB13 lists: MBSFN areas, cells, MCCH and MCS. At 64, the mobile terminal receives from the base station RRC signaling and MB SFN area configuration information and, at 65, the mobile terminal receives PMCH instances and MCCH. At 66, the mobile terminal monitors MCCH for any changes.

3GPP Release 12 has introduced a Group Communication Server Application Server (GCS AS). The GCS AS function is to signal to the mobile terminal the required configuration information that the mobile terminal needs in order to receive application data via eMBMS bearer services. As the mobile terminal detects it is moving away from the MBSFN area, for example by detecting a poor MBSFN signal quality or by monitoring one of the other parameters, listed above, it elects to receive data over unicast whilst it is still able to communicate effectively with the serving MBMS cell. The mobile terminal sets up a unicast flow to receive eMBMS data via unicast and, accordingly, ceases receiving eMBMS data via MBSFN. The mobile terminal is able to receive the eMBMS data from unicast and MBMS simultaneously thereby avoiding service interruption during this switching process. At a later time, the mobile terminal notifies the GCS AS that it is approaching the limit of communicating effectively with the serving MBSFN cell/sector and will soon be too far from the serving MBMS cell/sector to guarantee reliable operation and so initiates transition to a cell that is able to provide the mobile terminal with a stronger signal.

Switching from unicast delivery to eMBMS is also possible if the mobile terminal happens to enter an adjacent MBSFN area. The mobile terminal has ongoing communications with GCS AS, which will inform the mobile terminal when eMBMS delivery is available over MBSFN—along with the corresponding bearer service configurations. Whilst the mobile terminal is still receiving downlink unicast delivery, when eMBMS delivery becomes available over MB SFN, the mobile terminal can start receiving MBMS scheduling information over MCH and eMBMS bearer over MTCH. During this switching period, the mobile terminal will receive the eMBMS data from both unicast and MBMS. The mobile terminal will then notify the GCS AS that it is within the adjacent MB SFN area and that it is receiving eMBMS bearer service. The GCS AS will then stop the unicast delivery to the mobile terminal, which now will only receive services over MBSFN.

The present disclosure has application to audio and video broadcasting but also file broadcasting in mobile networks. In addition to mobile networks, the present disclosure may also have application to femtocell and small cell deployments, for example, in pre-loading certain content on devices to enhance QoE and optimize use of resources. Similar scenarios may arise for simultaneous software updates on multiple devices. The present disclosure has been described in an LTE context that could be deployed with existing multicast mobile networks, but the invention can be applied in any multicast mobile network where the network elements have similar roles regarding unicast and multicast service provision. When referring in the present application to a comparison of the quality of a signal, whether it is with the quality of a another signal or with a threshold, it will be understood that the comparison may trigger a change of state, depending on context, on the detection of the quality of a signal becoming at least one of less than, greater than and equal to the comparator signal or threshold.

It will be understood by those skilled in the art that, although the present disclosure has been described in relation to the above described example embodiments, the invention is not limited thereto and that there are many possible variations and modifications which fall within the scope of the invention. The disclosure is not limited to the use of intra-cell mobility procedures in cells located at MBSFN area boundaries but also in cells at other locations where switching to unicast prior to transitioning to a different cell may reduce or avoid service interruption.

The scope of the present disclosure includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method of operating a mobile communications network comprising a plurality of base stations, each base station comprising at least one transceiver, and wherein a first transceiver is comprised in a first base station, the method comprising:
at the first base station:
operating the first transceiver to:
transmit a first signal to serve a mobile terminal over multicast; and
receive information from the mobile terminal, wherein the information is a value of Reference Signal Received Power (RSRP) or Reference Signal Received Quality (RSRQ) of a second signal received at the mobile terminal from a second transceiver that is not serving the mobile terminal; and
receive further information from the mobile terminal, wherein the further information includes signal quality information of the first signal received at the mobile terminal from the first transceiver and wherein the further information also includes signal quality information of a third signal received at the mobile terminal from a third transceiver;
on the basis of a comparison of the RSRP or the RSRQ information of the second signal received at the mobile terminal with a threshold, switching communications between the first transceiver and the mobile terminal from multicast to unicast; and subsequently
on the basis of a comparison of the signal quality information of the first signal and the signal quality information of the third signal, both received at the mobile terminal, when the signal quality information of the first signal is no longer greater than the signal quality information of the third signal, providing to the mobile terminal an instruction instructing the mobile terminal to transition from being served by the first transceiver to being served by the third transceiver.

2. The method of claim 1, wherein the method further comprises, at the first base station:
monitoring loading of radio resources used by the first transceiver; and
varying the threshold in dependence on the monitored loading.

3. The method of claim 2, wherein the method further comprises, at the first base station:
upon detecting an increase in the loading, varying the threshold so as to reduce a rate at which mobile terminals served by the first base station are switched to unicast.

4. The method of claim 2, wherein the method further comprises, at the first base station:

upon detecting a decrease in the loading, varying the threshold so as to increase a rate at which mobile terminals served by the first base station are switched to unicast.

5. The method of claim 2, wherein the loading comprises at least one of a radio resource usage load at the first transceiver or traffic levels on radio frequency transmissions between the first transceiver and at least one mobile terminal.

6. The method of claim 1, wherein the method further comprises, at the first base station:
varying the threshold on the basis of a comparison with reference data, the reference data gathered through monitoring a plurality of mobile terminals being served by the first transceiver and transitioning to being served by the third transceiver, including data gathered through monitoring occurrences of switching communications between the first transceiver and the mobile terminal from multicast to unicast.

7. A non-transitory computer-readable storage medium storing a computer program element comprising computer program code which, when loaded into a computer system and executed thereon, causes the computer system to perform the method as claimed in claim 1.

8. A base station for a mobile communications network, the base station comprising:
a first transceiver configured to transmit radio signals to a plurality of mobile terminals and to receive radio signals from a plurality of mobile terminals, wherein the first transceiver is configured to:
transmit a first signal to serve a mobile terminal over multicast;
receive information from the mobile terminal, wherein the information is a value of Reference Signal Received Power (RSRP) or Reference Signal Received Quality (RSRQ) of a second signal received at the mobile terminal from a second transceiver that is not serving the mobile terminal; and
receive further information from the mobile terminal, wherein the further information includes signal quality information of the first signal received at the mobile terminal from the first transceiver and wherein the further information also includes signal quality information of a third signal received at the mobile terminal from a third transceiver; and
a processor configured to:
on the basis of a comparison of the signal quality of the second signal received at the mobile terminal with a threshold, switch communications between the first transceiver and the mobile terminal from multicast to unicast; and subsequently
on the basis of a comparison of the RSRP or the RSRQ information of the first signal and the signal quality information of the third signal, both received at the mobile terminal, when the signal quality information of the first signal is no longer greater than the signal quality information of the third signal, provide to the mobile terminal an instruction instructing the mobile terminal to transition from being served by the first transceiver to being served by the third transceiver.

* * * * *

UNITED STATES PATENT AND TRADEMARK OFFICE
CERTIFICATE OF CORRECTION

PATENT NO. : 11,510,116 B2
APPLICATION NO. : 16/310948
DATED : November 22, 2022
INVENTOR(S) : Richard Mackenzie It is certified that error appears in the above-identified patent and that said Letters Patent is hereby corrected as shown below:

On the Title Page

In Column 2, item (57), under "Abstract", Line 4, delete "terminals, in which" and insert -- terminals, --, therefor.

In the Specification

In Column 1, Line 59, delete "a the mobile" and insert -- the mobile --, therefor.

In Column 2, Line 33, delete "invention" and insert -- disclosure --, therefor.

In Column 7, Line 49, delete "invention" and insert -- disclosure --, therefor.

In Column 8, Line 66, delete "path 480" and insert -- path 484 --, therefor.

In Column 9, Line 22, delete "invention," and insert -- disclosure, --, therefor.

In Column 9, Line 24, delete "invention," and insert -- disclosure, --, therefor.

In Column 9, Line 38, delete "path 480," and insert -- path 484, --, therefor.

In Column 10, Line 28, delete "processor 512." and insert -- processor 510. --, therefor.

In Column 10, Line 67, delete "MB SFN" and insert -- MBSFN --, therefor.

In Column 11, Line 32, delete "MB SFN," and insert -- MBSFN, --, therefor.

In Column 11, Line 37, delete "MB SFN" and insert -- MBSFN --, therefor.

Signed and Sealed this
Eleventh Day of April, 2023

Katherine Kelly Vidal
*Director of the United States Patent and Trademark Office*

CERTIFICATE OF CORRECTION (continued)
U.S. Pat. No. 11,510,116 B2

In Column 11, Line 50, delete "invention" and insert -- disclosure --, therefor.

In Column 11, Line 63, delete "invention" and insert -- disclosure --, therefor.

In Column 11, Line 65, delete "invention." and insert -- disclosure. --, therefor.